United States Patent
Davison

(10) Patent No.: US 7,296,099 B2
(45) Date of Patent: Nov. 13, 2007

(54) METHOD, SYSTEM, AND PROGRAM FOR QUERYING ADAPTORS IN A SYSTEM TO DETERMINE INFORMATION ON THE ADAPTOR CONNECTIONS

(75) Inventor: James Mathew Davison, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 542 days.

(21) Appl. No.: 10/752,808

(22) Filed: Jan. 7, 2004

(65) Prior Publication Data

US 2005/0149643 A1    Jul. 7, 2005

(51) Int. Cl.
 G06F 13/10    (2006.01)
 G06F 15/173    (2006.01)

(52) U.S. Cl. .................. 710/15; 710/8; 710/9; 710/10; 710/34; 709/203; 709/223; 709/224; 707/10; 711/112; 711/113; 711/114

(58) Field of Classification Search .............. 710/8–10, 710/15, 34; 709/203, 223, 224; 707/10; 711/112–114
See application file for complete search history.

(56) References Cited

U.S. PATENT DOCUMENTS 6,662,015 B2 * 12/2003 Furlong ................. 455/456.5
6,671,776 B1 * 12/2003 DeKoning .................. 711/114
6,920,494 B2 * 7/2005 Heitman et al. ............ 709/223
7,013,303 B2 * 3/2006 Faybishenko et al. ........ 707/10
2003/0145078 A1 * 7/2003 Hubbard ..................... 709/224
2005/0138114 A1 * 6/2005 Connor et al. .............. 709/203

OTHER PUBLICATIONS

"SPCI Data Flow", May 1, 1995, TDB-ACC-NO NN9000599.*

* cited by examiner

*Primary Examiner*—Tammara Peyton
(74) *Attorney, Agent, or Firm*—David W. Victor; Konrad Raynes & Victor L.L.P.

(57) ABSTRACT

Provided are a method, system, and program for querying a plurality of adaptors in a system. A request is received to determine connection information for the adaptors in the system. A master task spawns a plurality of tasks to query the adaptors. Each spawned task updates adaptor information with information gathered from querying the adaptor. If no tasks are available to query at least one adaptor that has not been queried, then the master task queries one adaptor and updates the adaptor information with information gathered by querying the adaptor.

24 Claims, 8 Drawing Sheets

Adaptor Record

Assigned Task Entry

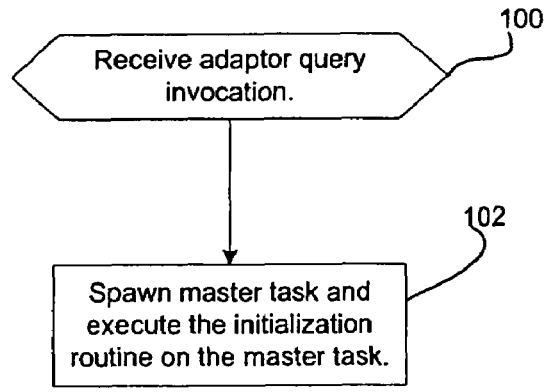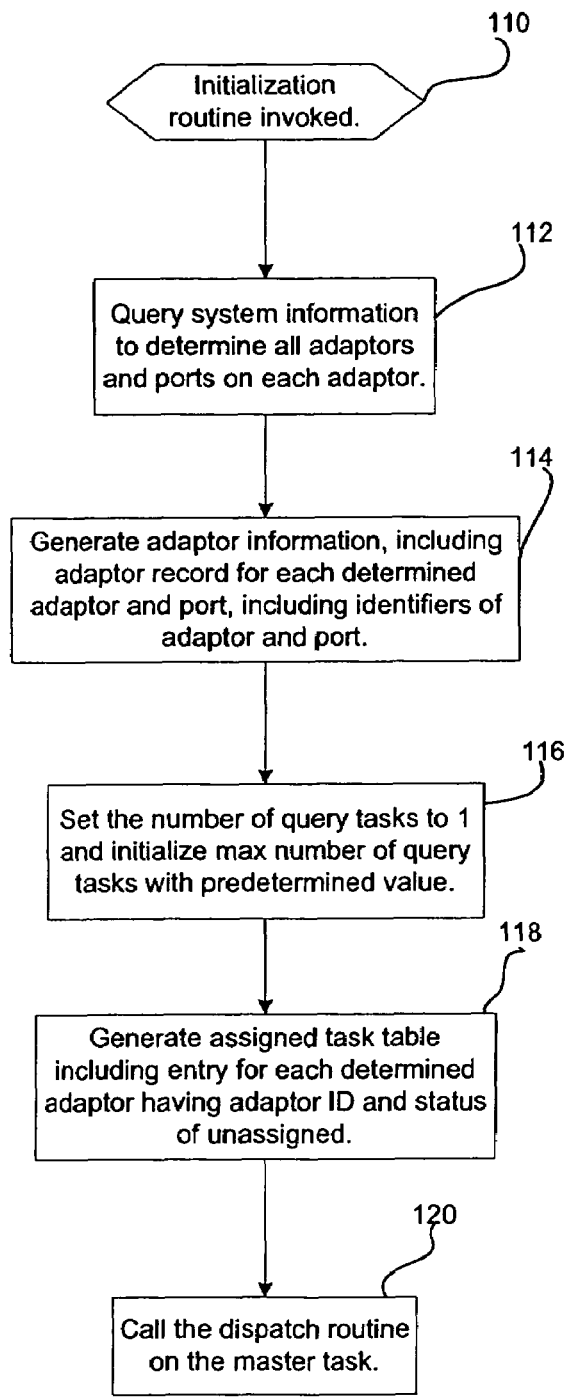

METHOD, SYSTEM, AND PROGRAM FOR QUERYING ADAPTORS IN A SYSTEM TO DETERMINE INFORMATION ON THE ADAPTOR CONNECTIONS

BACKGROUND OF THE INVENTION

1. Field of the Invention

The present invention relates to a method, system, and program for querying adaptors in a system to determine information on the adaptor connections 2. Description of the Related Art A storage subsystem, or enterprise storage server, such as the International Business Machines Corporation's ("IBM") (IBM is a registered trademark of IBM) Enterprise Storage Server, includes multiple adaptor cards to enable communication with different devices. The storage subsystem typically manages access to a storage system for multiple attached hosts. Certain of the ports on the adaptor cards in the storage subsystem may be connected to another device over a network, where such connection may comprise a point-to-point connection, arbitrated loop, fabric (e.g., Storage Area Network (SAN)), a broadcast bus (e.g., Ethernet) and other network topologies known in the art. The devices attached to the adaptors may comprise storage devices or other systems. Other adaptor ports may connect to a switch that provides connections to multiple devices or further cascading switches. The adaptors may support protocols such as Fibre Channel and additional network protocols.

A storage controller may also include a management interface to allow administrators to determine information on the storage controller and its connections. A management interface may be used to invoke a process to query each of the adaptor cards in the storage subsystem to determine the devices to which the storage subsystem is connected. This query process may involve querying a device directly connected to the adaptor or querying a switch to determine all possible devices in the network to which that port may connect through the one or more switches and determine the state of the connection and devices on the connection. The devices terminating on the connections may comprise another storage subsystem, storage devices or a switch providing a connection to additional switches, storage devices, and storage subsystems. The queried information allows the network administrator to obtain information on the nodes in the network available through the storage subsystem. Host systems may access the storage subsystem to access storage volumes on storage devices accessible to the storage subsystem.

In current storage subsystems, a single task may be dispatched to serially query each adaptor in a synchronous manner to determine status information on the connections supported by the queried adaptor and devices terminating on such connections.

SUMMARY OF THE INVENTION

Provided are a method, system, and program for querying a plurality of adaptors in a system. A request is received to determine connection information for the adaptors in the system. A master task spawns a plurality of tasks to query the adaptors. Each spawned task updates adaptor information with information gathered from querying the adaptor. If no tasks are available to query at least one adaptor that has not been queried, then the master task queries one adaptor and updates the adaptor information with information gathered by querying the adaptor.

BRIEF DESCRIPTION OF THE DRAWINGS

Referring now to the drawings in which like reference numbers represent corresponding parts throughout:

FIGS. 5-10 illustrate operations performed to query adaptors in accordance with embodiments of the invention.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
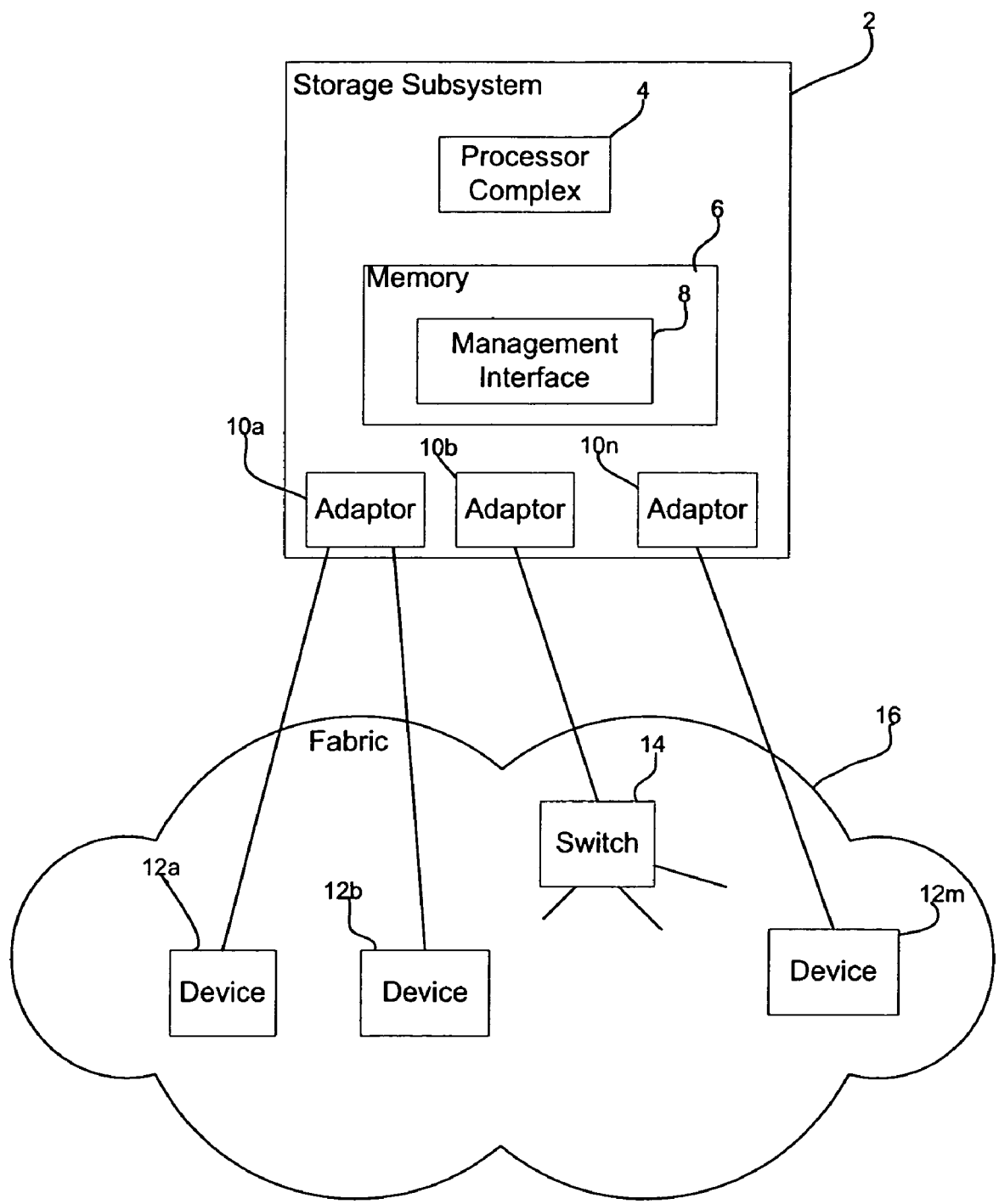
FIG. 1 illustrates computing network in which embodiments of the invention are implemented.

FIG. 1 illustrates a network computing environment in which embodiments of the invention are implemented. A storage subsystem 2 includes a processor complex 4, memory 6, and a management interface 8 to perform management related operations with respect to the components in the storage subsystem 2. The management interface 8 may enable remote users to perform management related operations with respect to the storage subsystem 2. The storage subsystem further includes a plurality of adaptors 10a, 10b . . . 10n, such as host bus adaptors, that provide connections with devices 12a, 12b . . . 12m and switches 14. A switch 14 would enable the adaptor to connect to other devices connected on that switch 14. The combination of switches providing connections to other switches and connected devices comprise a fabric 16 of nodes, where each device in the interconnected network fabric is a node, comprising another server, storage device, switch, etc. The fabric 16 may utilize network topologies known in the art, such as a point-to-point connection, arbitrated loop, fabric (e.g., Storage Area Network (SAN)), a broadcast bus (e.g., Ethernet).

Figure 2:
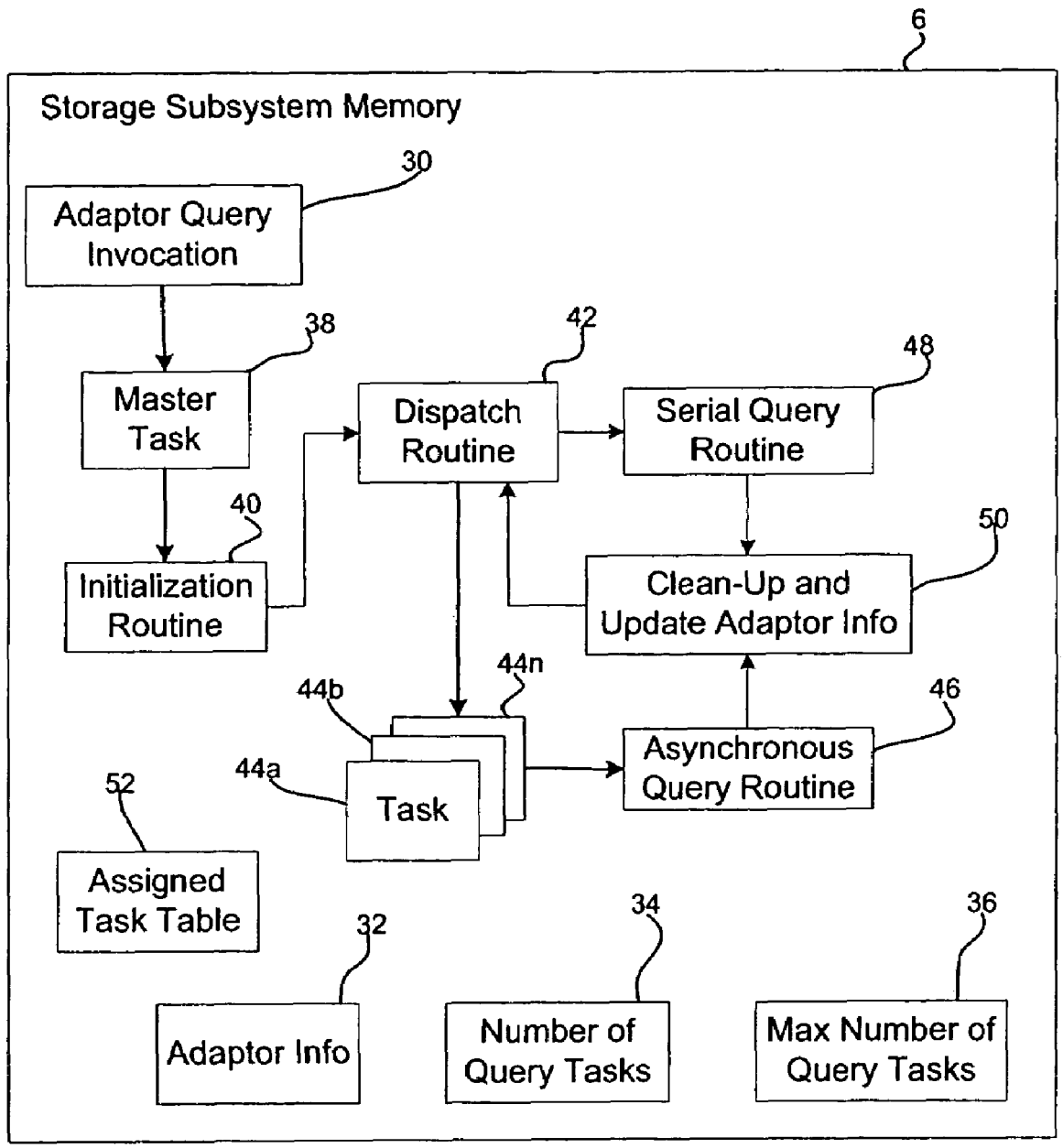
FIG. 2 illustrates program components and data structures in a system memory used in accordance with embodiments of the invention.

FIG. 2 illustrates the program components and information maintained in the storage subsystem memory 6 to query the adaptors 10a, 10b . . . 10n for connection information in accordance with embodiments of the invention. An adaptor query invocation 30 comprises the call generated through the management interface 8 to initiate the adaptor query process. This invocation 30 may be initiated from a user utilizing a graphical user interface (GUI) provided by the management interface 8 or from a scheduled program that periodically gathers connection information by using an Application Programming Interface (API) that invokes the adaptor query invocation 30. The invoked adaptor query process generates adaptor information 32, which stores the queried information for each port, representing a connection, in each adaptor 10a, 10b . . . 10n; a number of query tasks 34 which indicates the total number of executing tasks that are currently involved in the adaptor query process; and a maximum number of query tasks 36, which indicates a maximum number of tasks that may be assigned to the adaptor query process. The maximum number 36 may be set based on the total number of tasks that may concurrently execute in the storage subsystem 2 and the number of adaptors. The purpose of the maximum number 36 is to ensure that the adaptor query process does not consume a number of tasks and resources that could adversely effect critical storage subsystem 2 operations. In the described embodiments, the term "task" refers to a thread of execution in the storage subsystem 2 that may execute independently of other tasks, i.e., threads of execution, and may be represented by a data structure, such as a task control block.

Figure 3:
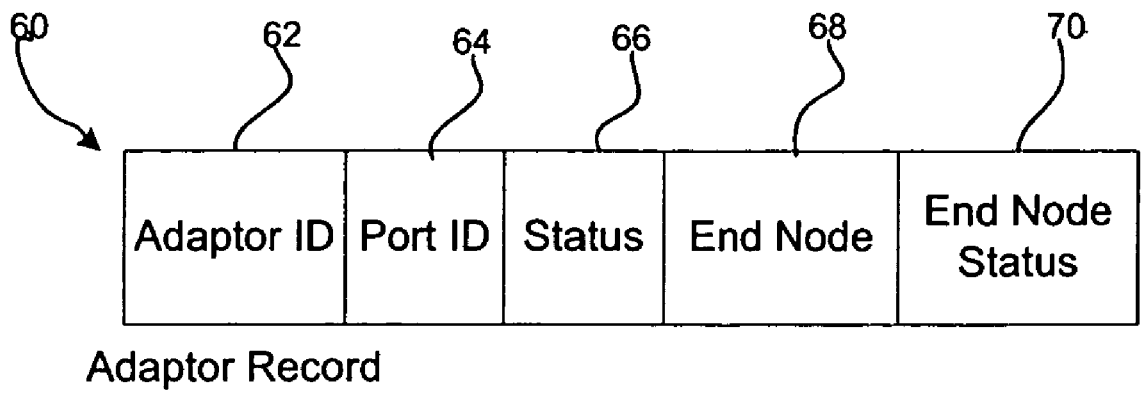
FIGS. 3 and 4 illustrate data structures maintaining information used in accordance with embodiments of the invention.

FIG. 3 illustrates details of the adaptor information 32, which is gathered when querying the adaptors. The adaptor information 32 includes for each adaptor 10a, 10b . . . 10n and port thereon an adaptor record 60 having:

Adaptor ID 62: provides a unique identifier of the adaptor 10a, 10b . . . 10n.

Port ID 64: unique identifier of port representing a connection, such as a point-to-point connection in the adaptor identified by field 62, where each adaptor 10a, 10b . . . 10n may have multiple ports.

Status 66: indicates the current status of the port 64 and connection represented by the port.

End Node 68: identifies an end node to which the port identified by field 64 connects.

End Node Status 70: identifies the status of the identified end node 68.

Figure 4:
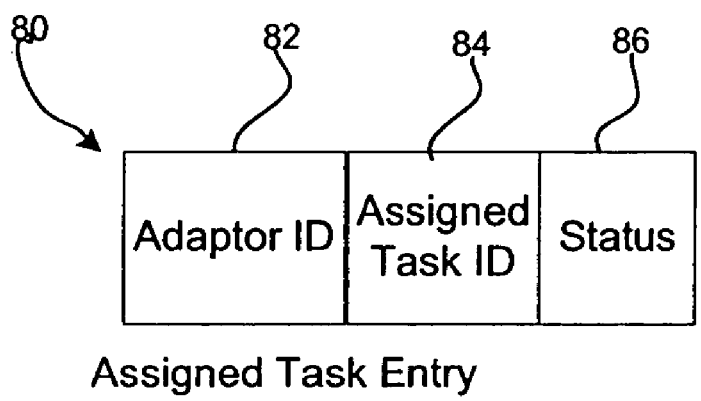

Upon initialization, the initialization routine 40 would also generate an assigned task table 52 that includes an entry for each adaptor. FIG. 4 illustrates each assigned task entry 80 as including an adaptor identifier 82, a task identifier 84 of a task assigned to query the adaptor information for the identified adaptor, and a status 86 of the query operation, such as completed, pending, unassigned.

With respect to FIG. 2, the adaptor query invocation 30 would spawn a master thread 38 to execute the initialization routine 40, which initializes the adaptor information 32 and other information used during processing, such as the assigned task table 52. The master task 38 further executes a dispatch routine 42. The dispatch routine 42 in turn spawns another thread 44a, 44b . . . 44n to execute an asynchronous query routine 46. The asynchronous query routine 46 allows for concurrent querying of the adaptors on different tasks 44a, 44b . . . 44n of execution, and asynchronous updating of the adaptor information 32 with the adaptor query results. The master task 38 would execute a serial query routine 48 to perform serial and synchronous querying of the adaptors if there are no more tasks available, i.e., the maximum number of adaptor query tasks 36 are being used for adaptor querying. After an adaptor is queried and information on the port, connection and end node are obtained, a clean-up and update routine 48 is executed on the task that performed the query to add the gathered adaptor information to the update record 80 in the adaptor information 32 and then call the dispatch routine 42 to initiate any further adaptor query processes until all adaptors 10a, 10b . . . 10n have been queried.

FIGS. 5-10 illustrate the operations performed to query the adaptors 10a, 10b . . . 10n using the components and information described with respect to FIG. 2. With respect to FIG. 5, upon receiving (at block 100) the adaptor query invocation 30 from the management interface 8, a master task 38 is spawned (at block 102) on which the initialization routine 40 is called.

FIG. 6 illustrates the operations performed by the initialization routine 40 executed by the master task 38. Upon being called (at block 110), the initialization routine 40 queries (at block 112) the storage subsystem 2 information to determine all adaptors 10a, 10b . . . 10n and ports on each adaptor. Information on the available adaptors 10a, 10b . . . 10n may be determined from system information generated during the initialization of the storage subsystem 2. Adaptor information 32 is generated including an adaptor record 60 for each determined adaptor 10a, 10b . . . 10n and port, including identifiers of the adaptor and ports. The initialization routine 40 further sets (at block 116) the number of outstanding query tasks 34 to one and initializes the max number of query tasks 36 with a predetermined value. The assigned task table 52 is generated (at block 118) including an entry 80 for each determined adaptor 10a, 10b . . . 10n, and the adaptor ID 82 is set to one determined adaptor having a status 66 of "unassigned". The dispatch routine 42 is then called (at block 120) on the master task 38 to begin the adaptor query processes.

Figure 7:
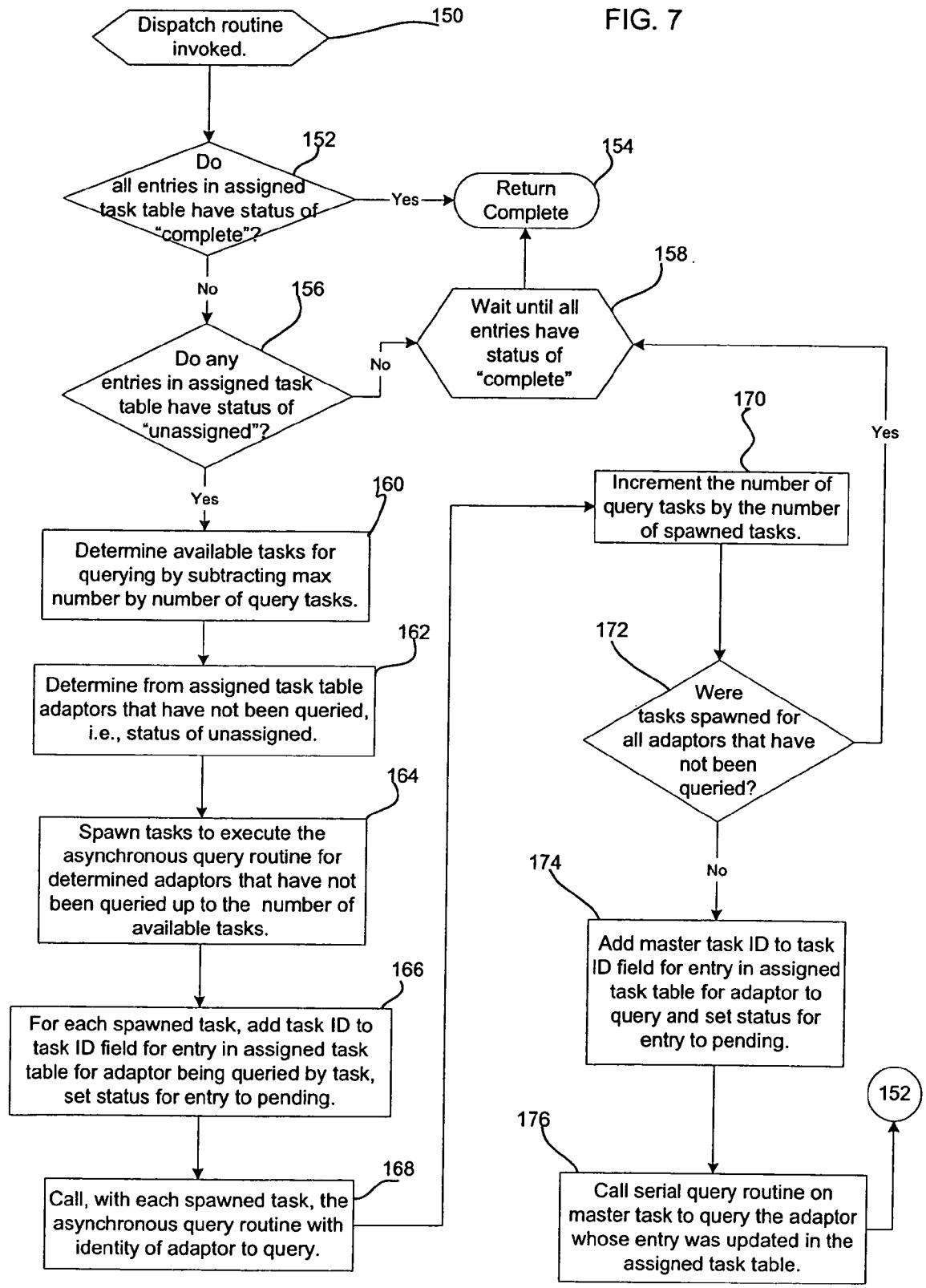

FIG. 7 illustrates operations performed by the dispatch routine 42 executed on the master task 38. Upon invoking the dispatch routine 42 (at block 150), if (at block 152) all entries in the assigned task table 52 have status of "complete", then the querying of all adaptors 10a, 10b . . . 10n and updating of the adaptor information 32 has completed and "complete" is returned (at block 154). Otherwise if (at block 156) no entries 80 (FIG. 4) in the assigned task table 52 have a status 86 of "unassigned" and some are "pending", then there are still query tasks pending and control proceeds to block 158 where the dispatch routine 42 waits for all the outstanding tasks to complete the adaptor query operations and then returns (at block 154) complete. If (at block 156) there are entries for adaptors having an "unassigned" status, then those adaptors have not been queried and the dispatch routine 42 determines (at block 158) available tasks for querying by subtracting the max number of query tasks 34 by the currently executing number of query tasks 36. A determination is made (at block 160) of the adaptors 10a, 10b . . . 10n indicated in the assigned task table 52 that have not been queried, i.e., status of "unassigned". The dispatch routine 42 spawns (at block 162) tasks 44a, 44b . . . 44n to execute the asynchronous query routine 46 for the determined adaptors that have not been queried up to the number of available tasks, determined at block 160.

The dispatch routine 42 further adds (at block 166), for each spawned task 44a, 44b . . . 44n a task ID to the task ID field 94 (FIG. 4) for the entry 80 in the assigned task table 52 for the adaptor, identified in field 82, being queried by the task and sets the status 86 for the entry to "pending". The asynchronous query routine 46 is separately and concurrently executed (at block 168) with each spawned task, and called with the identity of the adaptor 10a, 10b . . . 10n to query. The number of query tasks 34 is incremented (at block 170) by the number of spawned tasks. If (at block 172) tasks are spawned for all adaptors that have not been queried, then there are no more adaptors to be queried and control proceeds to block 158 to wait until all the adaptor queries have completed. Otherwise, if there are still adaptors 10a, 10b . . . 10n to query (i.e., having a status 86 of "unassigned"), then the dispatch routine 42 adds (at block 174) the master task ID to the task ID field 84 (FIG. 4) for the entry in the assigned task table 52 for the adaptor to query and sets the status for the entry to "pending". The dispatch routine 42 then calls (at block 176) the serial query routine 48 executed on the master task 38 to query the adaptor whose entry was updated in the assigned task table 52. After the master task 38 completes processing the serial query routine 48, control proceeds to block 152 to consider whether there are any adaptors that still need to be queried.

The dispatch routine 42 thus uses the maximum allowable number of tasks to asynchronously query the adaptors. If there are no more tasks available for querying the adaptors, then the dispatch routine 42 will use the master task executing the dispatch routine 42 to execute a serial query routine 48 to query one adaptor in a serial and synchronous manner.

Figure 8:
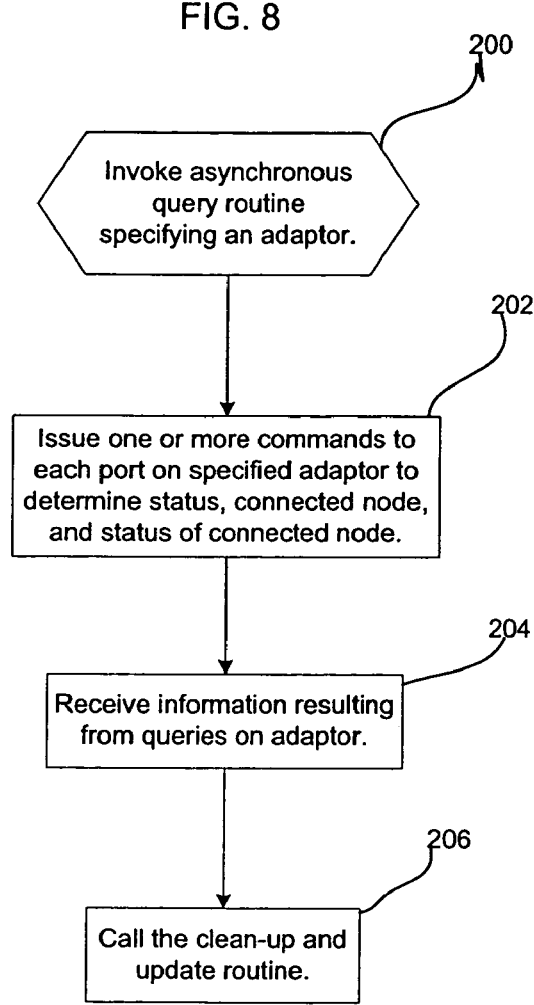

FIG. 8 illustrates operations performed by the asynchronous query routine 46 that may concurrently execute on the tasks 44a, 44b . . . 44n. Upon invoking the asynchronous query routine 46 (at block 200), the executing routine 46 issues (at block 202) one or more commands to each port on the specified adaptor 10a, 10b . . . 10n to determine the status 66, connected node 68, and status of connected node 78 (FIG. 3). Upon receiving (at block 204) information resulting from the query to the adaptor 10a, 10b . . . 10n, the clean-up routine 50 is called (at block 206) to update the adaptor information 32 and other fields. The clean-up routine may execute on the task 44a, 44b . . . 44n that was executing the asynchronous query routine 46 from which the clean-up routine is called.

Figure 9:
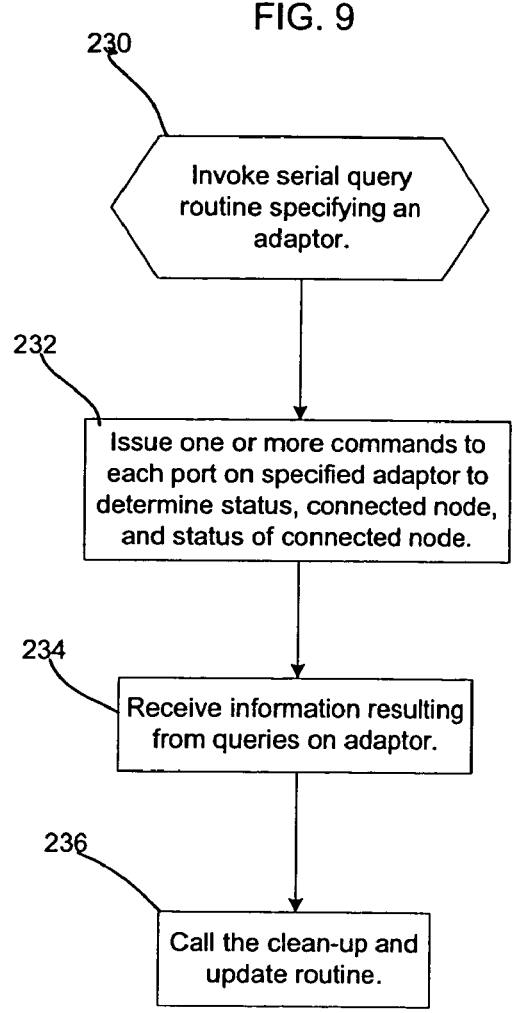

FIG. 9 illustrates operations performed by the serial query routine 48. Upon invoking (at block 230) the serial query routine 48 on the master task 38, the executing routine 48 issues (at block 232) one or more commands to each port on the specified adaptor 10a, 10b . . . 10n to determine the status 66, connected node 68, and status of connected node 78 (FIG. 3). Upon receiving (at block 234) information resulting from the query to the adaptor 10a, 10b . . . 10n, the clean-up routine 50 is called (at block 236) to update the adaptor information 32 and other fields. The clean-up routine may execute on the master task 38.

Figure 10:
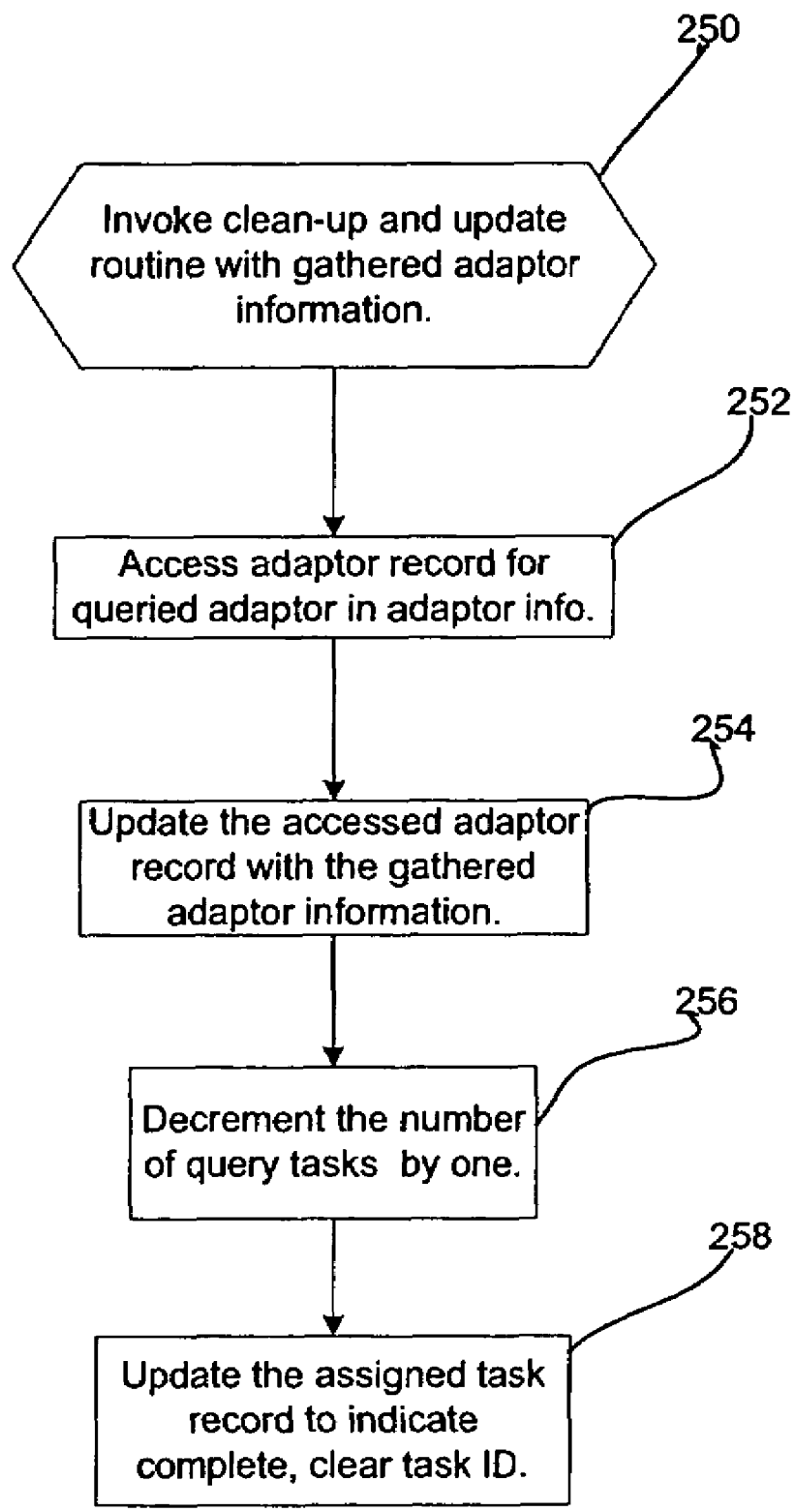

FIG. 10 illustrates operations performed by the clean-up routine 50 after the adaptor 10a, 10b . . . 10n is queried by routines 46 and 48. Upon invoking (at block 250) the clean up routine 52 on the master task 38 or tasks 44a, 44b . . . 44n, the adaptor record 60 (FIG. 3) for the queried adaptor 10a, 10bb . . . 10n in the adaptor information 32 is accessed (at block 252) and the accessed adaptor record 80 (FIG. 4) is updated (at block 254) with the gathered adaptor information. The clean-up routine 50 decrements (at block 256) the number of query tasks 34 by one and updates (at block 258) the accessed assigned task record 80 to indicate "complete" status 86 and clears the task ID field 84.

With the described embodiments, a dispatch routine uses a maximum number of permitted tasks to asynchronously query the adaptors to determine adaptor information, such as connection status, connected end devices 12a, 12b . . . 12m, 14, and status of end devices. If the maximum number of tasks are already in use querying the adaptors, then the same task executing the dispatch routine would execute a serial query routine to synchronously query an adaptor. After performing the serial query, the master task would then return to the dispatch routine to determine if there are any adaptors still left to query, and if so asynchronously query such adaptors using any available tasks or again synchronously query the adaptor on the master task. In this way, adaptor information is gathered in an asynchronous manner while balancing the use of system resources. Further, by asynchronously querying adaptors, any latencies or delays at one adaptor will not affect the information gathering performed asynchronously with respect to other adaptors.

ADDITIONAL EMBODIMENT DETAILS

The described embodiments for performing the adaptor query operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described embodiments, certain operations were described with respect to specific routines. In additional implementations, additional or fewer routines may be used to perform the operations described herein.

In the described embodiments, usage of variable numbers such as "n" or "m" refers to any integer value, and such value may differ in different uses of this variable to indicate that any number of a components or elements may be present.

In the described implementations, the adaptors connect to nodes in a fabric comprised of devices and/or switches connecting further devices. In alternative embodiments, the devices to which the adaptors communicate may be present in network types other than a fabric.

In the described embodiments, the querying of an adaptor would determine information on the device or switch terminating at a connection from such adaptor. In additional embodiments, querying an adaptor connected to one switch or cascading switches may additionally return information on all end devices connected to the switch or the cascading switches to which the adaptor is directory and indirectly connected.

The illustrated logic of FIGS. 5-10 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Figure 11:
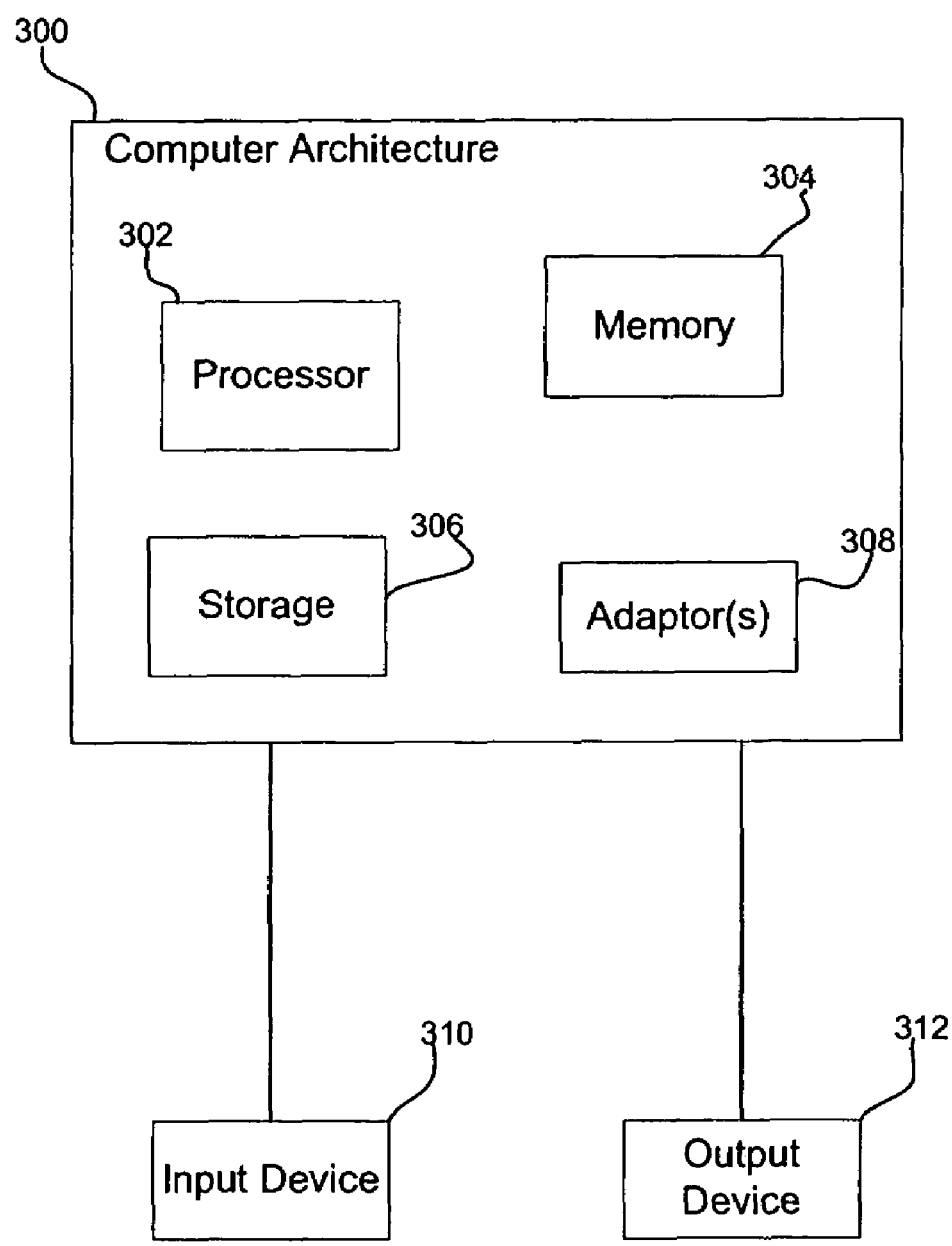
FIG. 11 illustrates an architecture that may be used with the components in the network computing embodiments described with respect to FIG. 1.

FIG. 11 illustrates one implementation of a computer architecture 300 of the systems and devices and nodes shown in FIG. 1. The architecture 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs in the storage 306 are loaded into the memory 304 and executed by the processor 302 in a manner known in the art. The architecture further includes one or more adaptors 308 to enable a point-to-point connection with an end device or switch. As discussed, certain of the devices may have multiple adaptors. The nodes in the fabric may or may not include an input device 310 and output device 312. The input device 310 may be used to provide user input to the processor 302, and may include a keyboard, mouse, pen-stylus, microphone, touch sensitive display screen, or any other activation or input mechanism known in the art. An output device 312 is capable of rendering information transmitted from the processor 302, or other component, such as a display monitor, printer, storage, etc.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for querying a plurality of adaptors in a system, comprising:
   receiving a request to determine connection information for the adaptors in the system;
   spawning, with a master task, a plurality of tasks to query the adaptors;
   updating adaptor information, by each spawned task, with information gathered from querying the adaptor; and
   if no tasks are available to query at least one adaptor that has not been queried, then querying, with the master task, one adaptor and updating the adaptor information with information gathered by querying the adaptor.

2. The method of claim 1, farther comprising:
   maintaining a maximum number of tasks that may concurrently be involved with querying the adaptors, wherein one or more tasks are available to query one adaptor if the number of tasks concurrently involved in querying the adaptors is less than the maximum number, and wherein the master task queries one adaptor if the total number of tasks involved in querying the adaptors equals the maximum number.

3. The method of claim 1, wherein after a task has completed, there is one additional task available to query one adaptor.

4. The method of claim 1, wherein after the master task completes querying one adaptor, the master task further performs:
   determining whether there are any adaptors that have not been queried;
   spawning available tasks to process the adaptors that have not been queried and update the adaptor information with information gathered from the query; and
   if no tasks are available to query at least one adaptor that has not been queried, then querying, with the master task, one adaptor and updating the adaptor information with information gathered by querying the adaptor.

5. The method of claim 1, wherein the adaptor information indicates for each port representing a connection on the adaptor, port status of the connection, an identity of a device attached on the connection, and a status of the attached device, wherein the device may comprise a switch or end device.

6. The method of claim 1, wherein the adaptors connect to nodes in a fabric network.

7. The method of claim 1, wherein the tasks spawned by the master task asynchronously query the adaptors and query the adaptors and update the adaptor information concurrently and independently and wherein the master task queries one adaptor synchronously.

8. The method of claim 7, wherein the master task determines whether additional adaptors need to be queried after completing the querying of one adaptor and updating the adaptor information.

9. A system, comprising:
   a processor;
   a plurality of adaptors;
   a master task executed by the processor to perform:
     (i) receiving a request to determine connection information for the adaptors in the system;
     (ii) spawning a plurality of tasks to query the adaptors; and
     (iii) if no tasks are available to query at least one adaptor that has not been queried, then querying one adaptor and updating the adaptor information with information gathered by querying the adaptor; and
   at least one spawned task executed by the processor to update adaptor information with information gathered from querying the adaptor.

10. The system of claim 9, wherein the master task is executed by the processor to further perform:
    maintaining a maximum number of tasks that may concurrently be involved with querying the adaptors, wherein one or more tasks are available to query one adaptor if the number of tasks concurrently involved in querying the adaptors is less than the maximum number, and wherein the master task queries one adaptor if the total number of tasks involved in querying the adaptors equals the maximum number.

11. The system of claim 9, wherein after a task has completed, there is one additional task available to query one adaptor.

12. The system of claim 9, wherein after the master task completes querying one adaptor, the master task further performs:
    determining whether there are any adaptors that have not been queried;
    spawning available tasks to process the adaptors that have not been queried and update the adaptor information with information gathered from the query; and
    if no tasks are available to query at least one adaptor that has not been queried, then querying one adaptor and updating the adaptor information with information gathered by querying the adaptor.

13. The system of claim 9, wherein the adaptor information indicates for each port representing a connection on the adaptor, port status of the connection, an identity of a device attached on the connection, and a status of the attached device, wherein the device may comprise a switch or end device.

14. The system of claim 9, wherein the adaptors connect to nodes in a fabric network.

15. The system of claim 9, wherein the tasks spawned by the master task asynchronously query the adaptors and query the adaptors and update the adaptor information concurrently and independently and wherein the master task queries one adaptor synchronously.

16. The system of claim 15, wherein the master task determines whether additional adaptors need to be queried after completing the querying of one adaptor and updating the adaptor information.

17. An article of manufacture for querying a plurality of adaptors in a system, wherein the article of manufacture causes operations to be performed, the operations comprising:

receiving a request to determine connection information for the adaptors in the system;

spawning, with a master task, a plurality of tasks to query the adaptors;

updating adaptor information, by each spawned task, with information gathered from querying the adaptor; and if no tasks are available to query at least one adaptor that has not been queried, then querying, with the master task, one adaptor and updating the adaptor information with information gathered by querying the adaptor.

18. The article of manufacture of claim 17, wherein the operations further comprise:

maintaining a maximum number of tasks that may concurrently be involved with querying the adaptors, wherein one or more tasks are available to query one adaptor if the number of tasks concurrently involved in querying the adaptors is less than the maximum number, and wherein the master task queries one adaptor if the total number of tasks involved in querying the adaptors equals the maximum number.

19. The article of manufacture of claim 17, wherein after a task has completed, there is one additional task available to query one adaptor.

20. The article of manufacture of claim 17, wherein after the master task completes querying one adaptor, the master task further performs:

determining whether there are any adaptors that have not been queried;

spawning available tasks to process the adaptors that have not been queried and update the adaptor information with information gathered from the query; and if no tasks are available to query at least one adaptor that has not been queried, then querying, with the master task, one adaptor and updating the adaptor information with information gathered by querying the adaptor.

21. The article of manufacture of claim 17, wherein the adaptor information indicates for each port representing a connection on the adaptor, port status of the connection, an identity of a device attached on the connection, and a status of the attached device, wherein the device may comprise a switch or end device.

22. The article of manufacture of claim 17, wherein the adaptors connect to nodes in a fabric network.

23. The article of manufacture of claim 17, wherein the tasks spawned by the master task asynchronously query the adaptors and query the adaptors and update the adaptor information concurrently and independently and wherein the master task queries one adaptor synchronously.

24. The article of manufacture of claim 23, wherein the master task determines whether additional adaptors need to be queried after completing the querying of one adaptor and updating the adaptor information.

* * * * *